UNITED STATES PATENT OFFICE.

FRITZ POLLAK, OF BERLIN, GERMANY.

PROCESS FOR THE PRODUCTION OF RESINLIKE CONDENSATION PRODUCTS.

1,210,982.  Specification of Letters Patent.  Patented Jan. 2, 1917.

No Drawing.  Application filed June 4, 1912.  Serial No. 701,572.

*To all whom it may concern:*

Be it known that I, Dr. FRITZ POLLAK, analytical chemist, residing in Berlin, Germany, (whose post-office address is 107 Königgrätzerstrasse, Berlin, Germany,) have invented certain new and useful Improvements in Processes for the Production of Resinlike Condensation Products; and I do hereby declare the following to be a full, clear, and exact description of the invention, such as will enable others skilled in the art to which it appertains to make and use the same.

It is known that phenols can be condensed to form soluble resins with formaldehyde and its polymers in the presence of contact media. These methods present the defect, however, that the condensation products obtained obstinately retain the contact medium employed, even after repeated cleaning. This property renders it necessary to have recourse to a series of washing, cleansing, and purifying operations which render the technical process considerably more difficult. If, on the other hand, the usual 40% formaldehyde solution is allowed to act upon crystallized phenols without a contact agent, it is only after heating for several days that any reaction takes place and even after lengthy boiling this always remains incomplete, so that the resin obtained is rendered impure by large quantities of unmodified primary material. Now it has been found that it is possible to operate quickly and readily without employing contact media if instead of a formaldehyde solution the anhydrous polymerids of formaldehyde sold under the name of trioxymethylene and representing a mixture of $\beta$ and $\gamma$; poly-oxy-methylene are employed and caused to act in a fine pulverulent form upon phenols. Even at a temperature of 80° C., so vigorous a reaction takes place with self-heating of the mass that it is necessary sometimes to moderate this reaction by the addition of anhydrous diluents. This action of anhydrous trioxymethylene is not one which could have been foreseen. On the contrary it would have been far more likely for the polymerized formaldehyde to behave less aggressively than the usual formaldehyde solution, as it is usual for monomolecular products to react more vigorously than multimolecular bodies. The polymerized hydrates present in highly concentrated formaldehyde do not present the property of reacting exothermically with phenols. In the case of the anhydrous trioxymethylene this property is not attributable to the higher concentration of the mass, as the reaction itself takes place vigorously and with self-heating even in case that so much water is added to the mass as is necessary for the formation of a trioxymethylene trihydrate.

The novel process presents the further advantage of permitting of an exact measurement of the formaldehyde employed such as has not hitherto been possible. For example in operating in the usual manner with a 40% aqueous formaldehyde solution with the addition of a contact medium, the reaction never takes place otherwise than inaction never takes place otherwise than incompletely, because the resin formed does not remain in solution to the end. As soon as the concentration of the formaldehyde solution has been suitably lowered, the resin is precipitated and carries with it the free phenol still present. By this means any further reaction of the latter with the formaldehyde is prevented and further heating of the mass then only produces the result that the formaldehyde solution is converted into para formaldehyde by the action of the contact medium and is thereby precipitated. The resin therefore contains both free phenol and free para formaldehyde in suspension. If it is dehydrated, the phenol escapes at high temperatures and leaves behind brown empyreumatic substances which render the resin impure and color it. The melting point of the resin is also relatively lower, which is a disadvantage in its practical employment in place of shellac.

The finely powdered anhydrous trioxy methylene dissolves in the hot phenol and only when this solution has taken place does the mass become self heated so that water is formed. Upon dehydration the resin formed yields but small quantities of volatile substances. The dehydrated resin is only slightly colored yellow. It only softens in boiling water. The resin is soluble in alcohol, ether, acetone and soda lye without residue and can be used in the usual way.

The novel process can be carried into practice in the following manner:

Example I: 94 parts of crystallized phenol and 25.7 parts of finely powdered anhydrous trioxymethlene are mixed with 3 parts of water and heated at 85° in the reflux condenser while agitating preferably in a current of inert gas. With vigorous boiling the temperature of the substance rises to approximately 113°. As soon as the internal heating ceases, the substance is still heated for a short time to 100 to 110° and then tapped off into the dehydration vessel. It is there heated to 160° to 170° when a scum forms and the substance becomes clear. It is then ready for use. Equimolecular quantities of the cresols or other homologous phenols can be employed instead of the phenol. The resins formed can of course be treated to form insoluble resins either before or after their dehydration by the addition of further quantities of formaldehyde or its polymers. But the insoluble resins which may thus be obtained, still present some deficiencies which may render them unsuitable for practical use. When exposed to the air for some time, they are apt to change their color; during the indurating process the surface layer usually assumes a red tint. Their transparency is in many cases deficient and very often an opaque product is obtained. In order to avoid all this, it becomes necessary to submit the soluble intermediate products described above to a special treatment during and after the initial condensation process.

It is known that a soluble transparent resin can easily be obtained by heating phenols with formaldehyde solution for some days. However, if anhydrous trioxymethylene is used instead of formaldehyde, owing to the absence of water the condensation which takes place differs in some respects from the condensation obtained with formaldehyde. The products obtained probably possess a higher degree of polymerization; they are very sensible to the influence of water which when hot is chemically bound by them. Therefore, if it is intended to make a soluble transparent intermediate product for use in the manufacture of transparent insoluble resins, it is advisable to so conduct the initial condensation process, that the water formed during the reaction be distilled off through a condenser, the distillate be collected and the formaldehyde contained therein be regenerated. Care should be taken not to add the whole of the trioxy methylene to the phenol in one portion; for, if this would be done, a sudden development of steam would ensue and large quantities of formaldehyde would be carried off with the steam and get lost. I have found that the quantity of formaldehyde carried away depends on the velocity of steam generation, and this again will differ within wide limits according to the surface presented by the liquid. It is therefore preferable to gradually add small quantities of anhydrous trioxy methylene, so that the generation of steam takes place slowly and regularly. If the process be conducted after this fashion, the loss of formaldehyde may be kept very small. There is however one drawback to the gradual adding of anhydrous trioxy methylene as described. Small quantities of anhydrous trioxy methylene are as a rule incapable of starting the reaction energetically. This is due to the fact that the products which are sold under the name of crystallized carbolic acid widely differ as regards their chemical constitution, and therefore react differently upon anhydrous trioxy methylene; this is due in the first line to the different percentage of cresols they contain. The reactional power of pure phenol is lower than that of cresol, especially ortho- and meta-cresol. Therefore, instead of using crystallized phenol, it is preferable in some instances to add to it a small quantity of ortho- or meta-cresol, or else to replace the crystallized phenol by one of minor purity which contains *per se* some per cents. of cresol, chiefly ortho-cresol.

I have further found that in the soluble resins obtained by this method part of the phenol is bound very firmly, while another part is bound less firmly; this part of the phenol probably forms substituted ethers of benzyl alcohol. These ethers may easily be decomposed, the phenol being split off. It is possible to effect this decomposition by treating the mass with cold water, water at a temperature less than 40° C., and this reaction may be made use of with advantage in the purification of the mass, as the heterogeneous substances (impurities) form an emulsion with water and can thus be removed together with the phenol. The soluble resin, which results from this purification, is a white soap like mass which, when warmed up, sets free part of the suspended water. The rest of the water cannot be removed unless the product be heated above 105° C. The product resulting from such heating of the mass above 105° C. is a light colored transparent tough soluble resin which is now ready for use in the production of insoluble resins of the highest quality. I proceed for instance as follows:

Example II: A mixture of 370 parts of pure crystallized carbolic acid and 6 parts of meta-cresol is heated in a water or oil bath under good stirring. A neutral gas such as for instance nitrogen may be introduced into this mixture, to which is then added 20 parts of finely powdered anhydrous trioxy methylene. The temperature of the bath is then allowed to rise up to 85 degr. C., when an energetic reaction will set in, the temperature of the mixture rising above 100 degr. C. When the temperature has dropped again below 100 degr. C., I add another 20 parts of anhydrous trioxy methylene, and this operation is repeated until in all 80 parts of anhydrous trioxy methylene have been added. During the exothermic reaction a small quantity of water distils over, carrying with it some phenol and traces of formaldehyde. This mass is now filtered, allowed to cool down and then repeatedly washed with large quantities of water of less than 40 degr. C. The remaining product is gradually heated above 105° C., preferably up to about 130 degr. C. whereby the water and most of the free phenol are distilled over. It is not advisable to heat the mass above 130 degr. C., as then the mass will assume a brownish color. The product obtained after cooling is a slightly yellowish resin, soluble in alcohol, ether, acetone and caustic soda and smelling but very faintly after phenol.

The manner of carrying out this process as well as the quantity of anhydrous trioxy methylene employed may be varied within wide limits. With more anhydrous trioxy methylene a thicker product will be obtained. If an excessive quantity of anhydrous trioxy methylene had been admixed, the product obtained can not be washed out properly with cold water and will have to be heated in order to entirely remove the phenol; this treatment however will result in the production of a reddish or brownish product. If on the contrary the quantity of anhydrous trioxy methylene used is too small, the loss of phenol will be far greater. It is therefore advisable to use about the quantities indicated in the example given above, which correspond to 3 molecules of phenol and 2 molecules of anhydrous trioxy methylene.

Having now particularly described and ascertained the nature of my said invention and in what manner the same is to be performed, I declare that what I claim is:

1. The method of producing soluble shellac-like resins which consists in heating a mixture of a crystallized body of the phenolic series and an anhydrous trioxy methylene.

2. The method of producing soluble shellac-like products which consists in heating a mixture of crystallized phenol, cresol and an anhydrous trioxy methylene.

3. In a method of producing soluble shellac-like resins by treating a mixture of a body of the phenolic series and an anhydrous trioxy methylene, the step of gradually adding the anhydrous trioxy methylene in several portions.

4. In a method of producing soluble shellac-like resins by heating a mixture of a body of the phenolic series and an anhydrous trioxy methylene, the step of washing the reaction product with water of less than 40 degr. C.

5. The method of producing soluble shellac-like resins which consists in heating a mixture of a crystallized body of the phenolic series and an anhydrous trioxy methylene, washing the reaction product with water of less than 40 degr. C. and heating the remaining mass above 105 degr. C.

6. The method of producing soluble shellac-like resins which consists in heating a mixture of a crystallized body of the phenolic series and an anhydrous trioxy methylene in the molecular proportion of about 3:2, filtering, cooling, repeatedly washing the reaction product with water of less than 40 degr. C. and heating it above 105 degr. C.

In testimony whereof I affix my signature, in presence of two witnesses.

Dr. FRITZ POLLAK.

Witnesses:
Henry Hasper,
Woldemar Haupt.

It is hereby certified that in Letters Patent No. 1,210,982, granted January 2, 1917, upon the application of Fritz Pollak, of Berlin, Germany, for an improvement in "Processes for the Production of Resinlike Condensation Products," an error appears in the printed specification requiring correction as follows: Page 1, lines 45-46, strike out the word "anhydrous"; and that the said Letters Patent should be read with this correction therein that the same may conform to the record of the case in the Patent Office.

Signed and sealed this 13th day of February, A. D., 1917.

[SEAL.]

R. F. WHITEHEAD,
*Acting Commissioner of Patents.*

Cl. 106—22.